(12) United States Patent
Khurana et al.

(10) Patent No.: US 7,406,329 B2
(45) Date of Patent: Jul. 29, 2008

(54) METHOD AND APPARATUS FOR SUBSCRIBING AND RECEIVING PERSONALIZED UPDATES IN A FORMAT CUSTOMIZED FOR HANDHELD MOBILE COMMUNICATION DEVICES

(76) Inventors: Varun Khurana, 450 Oak Grove Dr., Apt. 211, Santa Clara, CA (US) 95054; Sunil Goyal, 132 Aekta Avenue, Near 24 Number Phatak, Patiala CA (IN) 147001 Punjab ( * ) Notice: Subject to any disclaimer, the term of this patent is extended or adjusted under 35 U.S.C. 154(b) by 2 days.

(21) Appl. No.: 11/162,110

(22) Filed: Aug. 29, 2005

(65) Prior Publication Data

US 2006/0052089 A1 Mar. 9, 2006

Related U.S. Application Data

(60) Provisional application No. 60/606,949, filed on Sep. 4, 2004.

(51) Int. Cl.
*H04M 1/00* (2006.01)
(52) U.S. Cl. .................... 455/552.1; 455/557; 455/566; 455/414.1

(58) Field of Classification Search ............. 455/552.1, 455/557, 566
See application file for complete search history.

(56) References Cited

U.S. PATENT DOCUMENTS

| | | | |
|---|---|---|---|
| 6,247,048 B1 | 6/2001 | Greer et al. | |
| 6,421,781 B1 | 7/2002 | Fox et al. | |
| 6,473,609 B1 | 10/2002 | Schwartz et al. | |
| 2002/0123334 A1* | 9/2002 | Borger et al. | 455/419 |
| 2002/0133566 A1* | 9/2002 | Teeple | 709/218 |
| 2004/0133848 A1* | 7/2004 | Hunt et al. | 715/500 |

* cited by examiner

*Primary Examiner*—Temica M Beamer
(74) *Attorney, Agent, or Firm*—Aka Chan LLP

(57) ABSTRACT

A system for communicating with a mobile device is provided by aggregating content from at least one source of content having a first set of markup tags readable by executable code on the mobile device and a second set of markup tags. The aggregated content having the second set of markup tags is formatted with the first set of markup tags by either reorganizing the aggregated content, extracting irrelevant information, incorporating relevant information, combining one or more source together. A set of actions based on the formatted content is displayed using the first set of markup tags.

20 Claims, 7 Drawing Sheets

A simple paragraph.
Test content. This is line
one of the paragraph. This is line
two of the paragaraph. This is line
three of the paragraph. This is line
four of the paragraph. This is line
five of the paragraph.
End Line

FIG. 5

A simple paragraph.
Test content. This is line
one of the paragraph. This is line
two of the paragaraph. This is line
three of the paragraph. This is line
four of the paragraph. This is line
End Line

FIG. 6A one of the paragraph. This is line
two of the parag      one
three of the para     two
four of the parag     three
five of the paragr    four
End Line              five
                      End Line
                      Options

A simple paragraph.
Test content: This is line
one of the paragraph. This is line
two of the paragaraph. This is line
three of the paragraph. This is line
four of the paragraph. This is line

FIG. 8A two of the paragaraph. This is line
three of the paragraph. This is line
four of the paragraph. This is line
five of the paragraph.
End Line

FIG. 8B

METHOD AND APPARATUS FOR SUBSCRIBING AND RECEIVING PERSONALIZED UPDATES IN A FORMAT CUSTOMIZED FOR HANDHELD MOBILE COMMUNICATION DEVICES

CROSS-REFERENCE TO RELATED APPLICATIONS

This application claims the benefit of U.S. provisional patent application 60/606,949, filed Sep. 4, 2004, which is incorporated by reference along with other references cited in this application.

BACKGROUND OF THE INVENTION

The present invention relates to mobile device communications. More particularly, the present invention relates to content delivery to mobile devices.

Wireless technologies are becoming increasingly pervasive in our lives. The technology is quickly moving from voice into data enabling people to access content services anywhere anytime.

Content services via SMS (Short Messaging Service) and MMS (Multimedia Messaging Service) have been very successful on mobile phones because of their ease of use and simplicity. However, these restrict the medium to provide only basic services. Moreover, a user does not have much control over the content he/she receives. SMS and MMS offer limited or no personalization and users fear the risk of getting spammed.

Content available via WAP, iMode, or XHTML is also quite popular. The WAP/iMode portals or content portals specifically provided by wireless carriers, act as the main access point for browsing such content on handheld mobile communication devices. However, being a small device it is more suitable for accessing content that is specific, personalized and comes directly to the user rather than a user searching or browsing generic information like that available on the World Wide Web.

Therefore, a need exists for a system to tackle the existing limitations of the wireless content platforms and to provide enhanced wireless content services to users. The system should provide users a uniform interface for subscribing, accessing and interacting with personalized content. A primary purpose of the present invention is to solve these needs and provide further, related advantages.

SUMMARY OF THE INVENTION

Content today on wireless devices is mainly driven by either Short Messaging Service (SMS)/Multimedia Messaging Service (MMS) e.g., downloading a ring tone, wallpaper etc. via sending a SMS or MMS to a predefined number. The other most popular way of accessing wireless content is via WAP/iMode/HTTP where users can browse WML, CHTML, XHTML or HTML pages etc directly on the mobile device like they do it on the PC via the Internet. Wireless carriers often provide a specific wireless portal providing accessing to wireless carrier specific content via browsing. The subscription-based content is available via SMS/MMS but often a user has no control over the subscription; only limited content can be provided and the user experience is quite bad. The present invention provides an innovative request/subscription based model of accessing content where a user subscribes for specific content he is interested in, personalizes the content according to his needs providing a rich personalized experience to the user.

The invention provides an infrastructure for "user aware" personalized wireless content services. Mobile devices demand services which are concise, specific and offer high relevance to the user. The invention combines the ease of use of messaging systems (such as SMS, MMS) with the flexibility of wireless infrastructure systems such as WAP and iMode to provide enhanced content services. It also leverages the RSS technology providing an easy access mechanism for web based content, enhances and makes it mobile friendly, providing a simple and effective way for the users to receive personalized updates on their mobile phones.

The invention defines a language called WAML (Wireless Action Markup Language), which it uses for aggregating selective content from the web and makes it available on the small screens of handheld communication devices in a mobile friendly fashion. Content providers can add WAML tags in existing content such as HTML or can create content directly in WAML. WAML provides an enhanced mechanism for viewing existing content or parts of existing content on mobile devices in a mobile friendly fashion. It also enables definition of content personalization options.

The invention consists of two key components, a server and a client application. The Server component aggregates content in a variety of formats (RSS, XML, HTML etc.) including content defined in WAML. The Server component also selectively filters available web content to make most use of the small screen of the handheld communication device. It also enables users to specify content personalization options and receive only specific content in a personalized fashion on his/her handheld device in WAML format.

The Client component of the invention consists of a downloadable/preinstalled application on the user's mobile phone that enables the device to receive updates, browse and interact with mobile content. It provides real-time updates as well as a rich interface for multimedia content. It also offers a mobile friendly environment for viewing content optimized for mobile phones and provides a synchronizing mechanism between the Server and the Client component.

The personalized interface of the client enables users to specify personalized options for content. These options are synced with the server and enable a user to get specific content in a personalized manner according to his/her needs.

Another embodiment of the invention enables content syncing and archival. The invention enables seamless synchronization as well as archiving content at the server in a manner that allows minimal bandwidth consumption between the Client and Server.

Another embodiment of the invention includes viewing links embedded in the content in a mobile friendly fashion. e.g., WML, XHTML or HTML pages contain links to other pages via using <a href> tag. Such links are hard to browse on mobile devices as a large number of mobile devices do not have any support for pointer devices. The invention provides an innovative fashion to browse such links.

In another embodiment, the invention includes a method of communicating with a mobile device including: (a) aggregating content from at least one source of content having a first set of markup tags readable by executable code on the mobile device and a second set of markup tags; (b) formatting the aggregated content having the second set of markup tags with the first set of markup tags; and (c) displaying a set of actions based on the formatted content using the first set of markup tags. Formatting may include one of reorganizing, extracting, or combining, or combinations of these. Extracting may refer to incorporating relevant or certain content, while removing irrelevant or other content. Combining may refer to combining one or more sources.

Detailed features and advantages of the invention as well as the structure and operation of the invention are described below with reference to the accompanying figures.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings:

FIG. 5 is a diagram schematically illustrating a view on an emulator in accordance with one embodiment.

FIG. 6a is a diagram schematically illustrating a screen on a mobile device displaying links in accordance with one embodiment.

FIG. 6b is a diagram schematically illustrating a screen on a mobile device displaying links in accordance with one embodiment.

FIG. 7a is a diagram schematically illustrating a screen on a mobile device displaying links in accordance with another embodiment.

FIG. 7b is a diagram schematically illustrating a screen on a mobile device displaying links in accordance with another embodiment.

FIG. 8a is a diagram schematically illustrating a screen on a mobile device displaying links in accordance with another embodiment.

FIG. 8b is a diagram schematically illustrating a screen on a mobile device displaying links in accordance with another embodiment.

DETAILED DESCRIPTION

Figure 1:
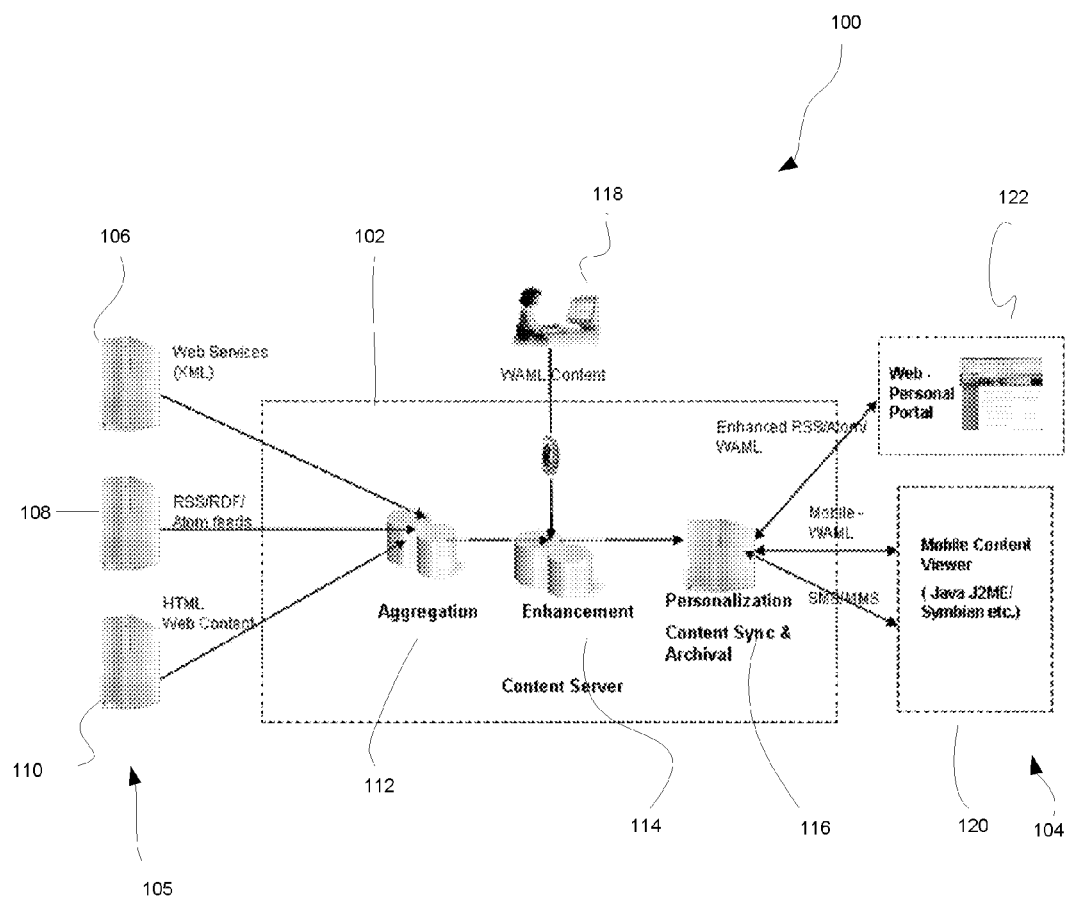
FIG. 1 is a diagram schematically illustrating a system in accordance with one embodiment.

Embodiments of the present invention are described herein in the context of a method and apparatus for subscribing and receiving personalized updates in a format customized for handheld mobile communication devices. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with one embodiment of the present invention, the components, process steps, and/or data structures may be implemented using various types of operating systems (OS), computing platforms, firmware, computer programs, computer languages, and/or general-purpose machines. The method can be run as a programmed process running on processing circuitry. The processing circuitry can take the form of numerous combinations of processors and operating systems, or a stand-alone device. The process can be implemented as instructions executed by such hardware, hardware alone, or any combination thereof. The software may be stored on a program storage device readable by a machine.

In addition, those of ordinary skill in the art will recognize that devices of a less general purpose nature, such as hardwired devices, field programmable logic devices (FPLDs), including field programmable gate arrays (FPGAs) and complex programmable logic devices (CPLDs), application specific integrated circuits (ASICs), or the like, may also be used without departing from the scope and spirit of the inventive concepts disclosed herein.

The present invention relates to a method enabling smart aggregation of content available on the Internet and delivering that content in a mobile friendly fashion on handheld mobile communication devices. The user of a mobile communication device will be able to subscribe for specific content, personalize the content according to his/her preferences, and can view the content in a simple to use fashion.

Embodiments of the present invention are directed towards a system, method, and apparatus for aggregating and selecting relevant content from various sources, making it available on handheld mobile communication devices in a mobile friendly fashion and enabling users to specify his/her preferences to receive specific content.

FIG. 1 is a diagram schematically illustrating a system 100 in accordance with one embodiment. The system depicted includes a Content Server 102 and a Content Viewer 104. Content Server 102 aggregates content 105 from multiple data sources such as Web Services (e.g., Amazon Web Services) and XML data available via HTTP 106, RSS/Atom feeds 108, HTML web content 110, or any other protocol.

Content Server 102 enhances the aggregated content 105 and converts it to a mobile friendly format (WAML) which is later delivered to mobile devices. WAML provides a rich format to view content and to define actions on that content, for example, sending comments on a news article is a news specific action. Content Viewer 104 provides an easy to use and customizable view for actions.

Content Server 102 includes an aggregation engine 112, an enhancement engine 114, and a personalization engine 116. WAML Content 118 may directly communicate with enhancement engine 116. The functions of the components of Content Server 102 are described in more detail in FIG. 2.

Personalization engine 116 of Content Server 102 also enables advanced content personalization and customization so that a user only gets specific content of his/her interest. The platform also enables mobile devices to sync content with Content Server 102.

Content Viewer 104 includes a mobile content viewer 120 and a web-personal portal 122. Content Viewer 104 enables users to view content and updates, personalize and access information made available via Content Server 102. Content Viewer 104 provides an interface enabling the user to view content and interact with the content. Content Viewer 104 provides real-time updates as well as a rich interface for multimedia content. Content Viewer 104 also offers a mobile friendly environment for viewing content optimized for mobile phones and provides a synchronizing mechanism with Content Server 102.

Content Viewer 104 enables viewing links embedded in the content in the form of actions because such links are hard to browse on mobile devices as a large number of mobile devices do not have any support for pointer devices. One embodiment to the present invention provides an innovative fashion to browse such links.

Figure 2:
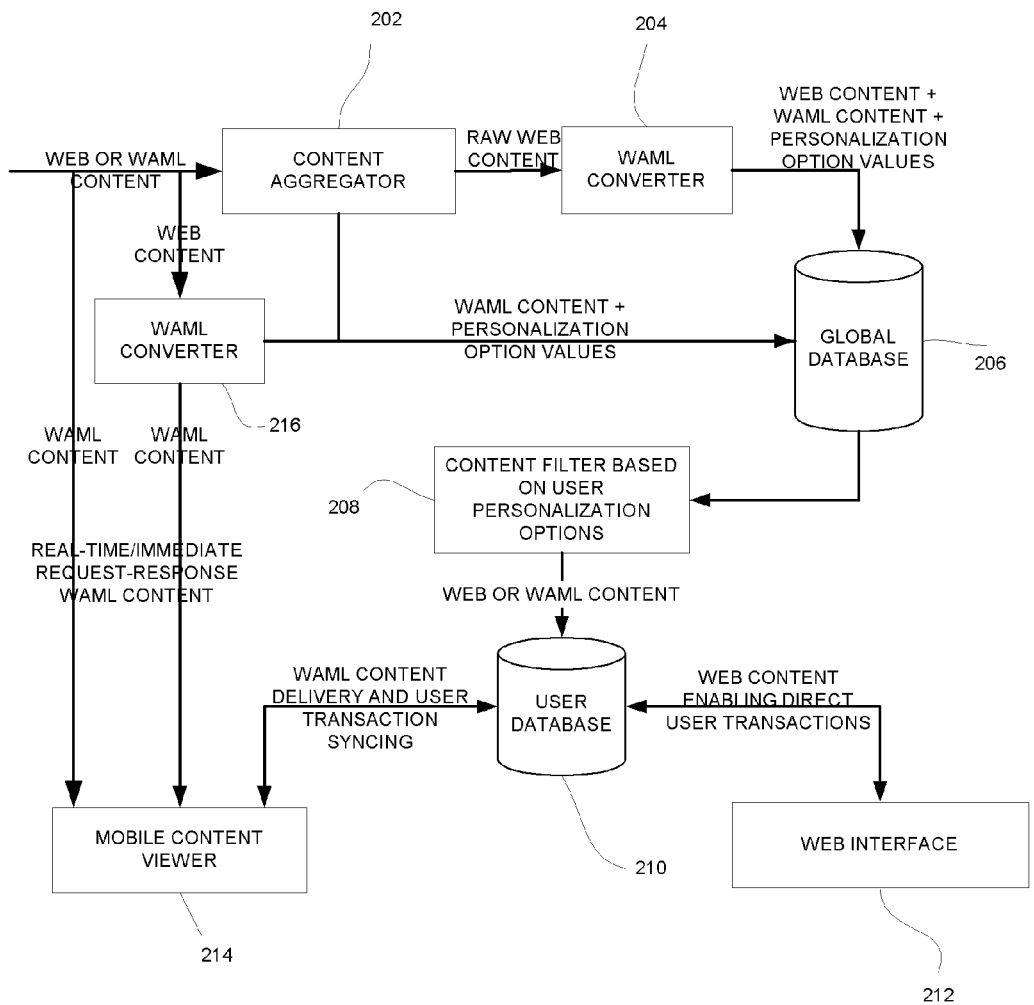
FIG. 2 is a diagram schematically illustrating a content server in accordance with one embodiment.

FIG. 2 is a diagram schematically illustrating the architecture of Content Server 102 in more detail on how personalized content services on wireless devices are provided. A Content Aggregator 202 is responsible for aggregating content from various data sources on the Internet. The aggregated content will have none or at least one of the following:

WAML tags: These tags embedded in content enable easy convertibility of content to WAML such that its appearance is optimized for display on small screens of handheld devices.

WAML Personalization Options Values: These are certain values associated with content which enables users to specify the content of interest. Depending on the value(s) of the WAML personalization options set by the user the content will or will not be delivered to the user.

Content Aggregator 202 also aggregates raw web content that does not contains any WAML tags (e.g., html, rss, xml feed, etc.) from the web. Content Aggregator 202 aggregates this content and a WAML Converter 204 transforms this content into WAML using some predefined policies.

WAML Converter 204 is responsible for converting content into the mobile friendly WAML format using WAML tags (if present) embedded in the content. WAML Converter 204 also filters out the personalization option values associated with the content. The Web content, WAML content, and personalization option values are stored in a Global Database 206 as shown in FIG. 2.

Content Filtration 208 based on personalization options is responsible for filtering the global content on a per-user basis depending on each user content personalization options and the corresponding values embedded in the content. Content Filtration 208 stores the personalized user content in a User Database 210.

A Web Interface 212 allows users to browse subscriptions and content associated with their subscriptions, perform transactions on the content for example, adding a new subscription, marking content as important, changing personalization options, deleting content etc.

A Mobile Content Viewer 214 provides an interface to view subscription-based content on wireless devices such as mobile phones, PDAs, or any other mobile electronic device. Mobile Content Viewer 214 is described in more detail in FIG. 3.

Another WAML converter 216 converts Web content and communicates directly with the Mobile Content Viewer in real-time in response to a request. Likewise, WAML content is directly supplied to the Mobile Content Viewer in real-time in response to a request.

Figure 3:
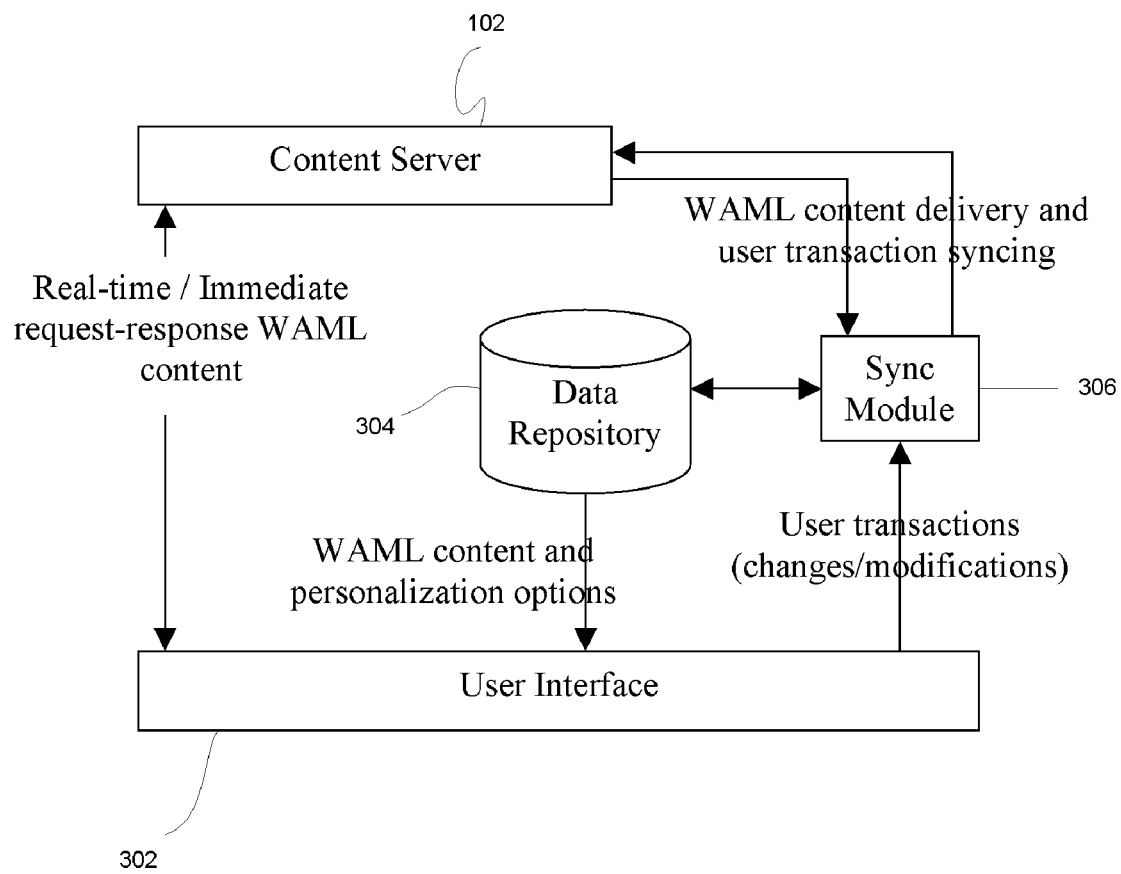
FIG. 3 is a diagram schematically illustrating a mobile content viewer in accordance with one embodiment.

FIG. 3 is a diagram schematically illustrating a mobile content viewer in accordance with one embodiment. A User Interface 302 communicates with Content Server 102, a Data Repository 304, and a Synchronization Module 306. With User Interface 302, the user is able to view his subscriptions, perform actions on the content so received, delete content, set personalization options, forward content etc. The types of operations can be divided into three categories:

Viewing information: Information that is viewed is read from Data Repository 304 or is directly fetched from Content Server 102 via the simple request-response mechanism.

Operations/Transactions: Any sort of modifications to user database 210, e.g., transactions like adding subscriptions, deleting content, changing personalization options etc. are sent to sync module 306, which is responsible for making the changes to user database 210 and propagating all these transactions to Content Server 102 at appropriate times.

Real-time/Request-response: For operations that require immediate request response or real-time content from Content Server 102, Mobile Content Viewer 214 follows a simple request/response model for fetching content (can be WAML or non-WAML content such as HTML, XHTML, WML).

Synchronization Module 306 is responsible for all interaction with Data Repository 304. It performs functions such as:

1. Get all changes made by the user via user interface 302, make those changes in data repository 304 and propagate them to Sync Module 306.

2. Get all changes or new messages from Content Server 102 and populate data repository 304.

Synchronization Module 306 is optimized to use minimal bandwidth for communication with Content Server 102. Synchronization Module 306 is also optimized to perform minimum processing as mobile devices usually have limited processing power and memory. Note that the content reaching the mobile device is WAML where the appropriate conversion has been done by the WAML converter 204/216 on the content server 102. This is one illustration of the invention. The invention also covers the case when with increasing processing power on the mobile device, it would obtain raw web content and perform the WAML conversion on the mobile device itself or directly render the content for displaying appropriately without performing explicit conversion.

The next section describes WAML in detail, the functionality it provides and how the above-defined architecture makes use of the WAML to provide personalized subscription based content on the web and the wireless devices.

WAML (Wireless Action Markup Language)

Most of the content available on the Internet has links to other content, for example, HTML has "a href" tags that link to other HTML pages. This is not easily viewable on the small screens of mobile phones, which mostly do not have a pointing device allowing one click on a point on the screen. Moreover, the display screens are small. For example, if a user reads RSS message descriptions and wants to further view the HTML content, he/she will not be able to conveniently do that using his/her mobile phone. WAML tags enables existing web content providers to easily mobile-enable their html content that they provide today in a customized manner for the small screens of handheld devices. WAML tags enable the Content Server to aggregate content and mobile enable it smoothly.

WAML also enables content providers to specify content personalization options for their content, which is then used to provide personalized content to the user (e.g., A content provider providing content for cheap airline tickets can specify that a user can request information within certain price ranges).

WAML also provides a simple, intuitive, easy to use communication way for the small screens of mobile phones or handheld devices. At a high level the language provides a mechanism for users to view content and perform a set of pre-defined actions on that content.

Selective Content Aggregation Using WAML Tags

In this section, we talk about how existing web content providers can easily make their HTML content available via the Content Server by inserting a few tags in their existing HTML pages. That will enable the Content Server to easily generate mobile friendly WAML from the HTML pages and easily make HTML available on mobile phones. With WAML content the user will be able to view content on the small screen and perform specific actions on it. We also explain how content providers may specify personalization options' values within the content to enable users to receive specific content.

Following tags represent one set of syntax to achieve the purpose. Also note that although we mention these tags in HTML context, these are applicable to any other content format.

We define the following tags in HTML that enable the WAML converter engine to easily generate WAML from HTML pages. This will enable content providers on the web to easily mobile-enable their existing HTML content.

1. WAML_PAGE: All waml tags in an HTML page must be enclosed within this tag. This tag is used to identify whether a particular HTML page is waml enabled or not. A version attribute for keeping track of version of waml tags, it is specified within "waml_page" tag.

<waml_page version=1.0>
. . . All waml tags come between the waml_page tags . . .
</waml_page>

The version attribute just specifies the version number for the WAML language. NOTE: Every HTML page that is waml enabled needs to have this tag. We define how to create multiple waml pages from the same HTML page in a later in this section.

2. WAML_TITLE: This tag is used for defining the title of the waml page.

<HTML>
<TITLE><waml_title>Yahoo news story title </waml_title></TITLE>
</HTML>
OR
<HTML>
<waml_title><TITLE>Yahoo news story title </TITLE></waml_title>
</HTML>
OR
<HTML>
<TITLE waml=true>Yahoo news story title </TITLE>
</HTML>

In the above example the "TITLE" is a specific tag within HTML. Enclosing the HTML TITLE tag with title $waml_{13}$tag, enables the HTML TITLE tag to be part of the WAML page. The Content Server will ignore the title or any other tags it does not understand.

3. WAML_DATE: This value is a string, used for defining dates.

<HTML>
<waml_date>22 Jun. 2004</waml_date>
</HTML>

NOTE: For all waml tags, if the content provider does not wish the string within the waml tags to show up on HTML pages, he/she can also define it as follows:

<HTML>
<waml_date description="22 Jun. 2004"/>
</HTML>

4. WAML_AUTHOR: This tag is used to define the author of the page.

<HTML>
<waml_author>Sunil Goyal</waml_author>
</HTML>

5. WAML_SUMMARY: This tag is for defining say a first paragraph to be equivalent to a summary. It is optional.

<waml_summary>1-2 paragraphs of content</waml_summary>

6. WAML_CONTENT: This tag is for defining valid content on the page. There can be multiple such tags.

<waml_content name="main" parsetype="text">news story . . . </waml_content>
<waml_content name="screen1" parsetype="xhtml"><B>news story</B> </waml_content>

By specifying the above tag at selective places the content provider can make sure that the most relevant part of the content is shown on the small screen of a handheld.

Every WAML_CONTENT tag contains an identifier with the "name" attribute. In the above example "screen1" is the identifier of one of the waml_content pages. In a particular waml page, there can be multiple waml_content tags. But only content specified within one of the waml_content tags will be rendered as default (The identifier of that particular waml_content should be set to "main").

WAML_CONTENT tag can have an attribute called "parsetype" associated with it, which specifies what kind of content is enclosed in between the waml_content tags.

<waml_content parsetype="text">news story . . . </waml_content>
<waml_content parsetype="xhtml"><B>news story</B> </waml_content>

The value of parsetype equals to "text" specifies, only plain text is enclosed within the waml_content tags. The value "xhtml" specifies, that xhtml tags are embedded within the waml_content. Custom values with a specific interpretation can also be specified for parsetype.

7. WAML_LINK: Certain "a href" tags if occurring within waml_content tags can be included. These tags will only be shown on various devices depending on the hardware features of that particular handheld device.

A link for waml page can be enabled by
<waml_link><a href="http://www.yahoo.com"> yahoo </a> </waml_link>
OR
<a waml="true" href="http://www.yahoo.com"> yahoo </a>

8. WAML_ACTION: On the Viewer content appears and is followed by a list of actions that the user can perform on the content. These actions are visible in the options menu on the handheld device.

<waml_action name="getrating" value="Get Rating"
link="www.yahoo.com/news/story1" order="2" method="get"/>

Instead of having links which are not that suitable for handhelds, a content provider may specify those links as actions which can performed on the mobile content enabling easy browsing on the small screen of the handheld which may not have a pointing device.

WAML_ACTION differs from links (a href links in HTML, WAML_LINK etc.) in one another aspect; WAML_ACTION can have content associated with them. Content with any of the actions can be defined using the tag <waml_content action="actionname"> </waml_content>and all html within these 2 tags will be associated with the appropriate action just as described in the previous sub-section 6. Or alternatively WAML_CONTENT tags can be embedded within WAML_ACTION tag as shown below.

```
<waml_action name="comments" value="Comments "
link="www.yahoo.com/news/story12" order="2" method="post">
<waml_content parsetype="xhtml">
Subject
<input type="text", name="subject"/>
Description
<input type="text", name="description"/>
</waml_content>
</waml_action>
```

Assigning content with waml_action enables content to be prefetched along with the specific link and to be shown as well as cached by the Mobile Content Viewer.

WAML actions can be of two types:

Regular WAML Actions as described above

Internal WAML Actions

Internal WAML actions imply that the content is already there within the WAML page and that particular content is to be shown unlike regular WAML actions where content has to be fetched via making a request to an external system.

```
<waml_action      name="waml1"      value="Next"
internal_link="screen2" order="1"/>
```

The value of the internal_link refers to the identifier of the waml_content tag. The content within the waml_content tag will be displayed (which has been referred by internal_link) when this action is selected on the phone.

WAML_ACTION can also have certain types associated with them. For example,

```
<waml_action name="comments" type="PostComments"
value="Comments"
link="www.yahoo.com/news/story12"      order="2"
method="post"/>
```

Specifying types enables Content Viewer 214 to cache the action once and apply the same action on multiple types of content. e.g., For an action of type submitting comments to news article, the waml_action and the waml_content associated with waml_action is also the same, the only thing that changes is the news story or the link attribute or there might be other variables associated. Based on type, the Mobile Content Viewer can only prefetch the waml_content once and then apply the same waml_content for the waml_action defined with the same type.

WAML_ACTION can also contain another attribute called "id" which specifies to which page a particular action is associated with. This is explained in detail in point 12 of this section.

9. WAML_IMAGE: Including an image, this tag will enable images to be captured but certain images might not be shown on some handheld devices depending on the capability of the handheld device.

```
<waml_image><IMG  SRC=""height="" width=""/></waml_image>
```

10. WAML_INPUT: This tag will enable input types to be captured.

```
<waml_input><input   type=text   name=variable></waml_input>
```

NOTE: waml does not interpret FORM tags in html. Input Types are explained in detail in a later section.

11. WAML_TABLE: This tag will enable html tables to be captured but certain tables might not be shown on some mobile devices.

```
<waml_table>
<table>
<tr>
<td></td>
```

```
<td></td>
</tr>
<tr>
<td></td>
<td></td>
</tr>
</waml_table>
```

12. WAML Pages:

A sample HTML page with waml tags:

```
<HTML>
<head>
</head>
<body>
<waml_page>
<TITLE><waml_title> Yahoo news story title </waml_title></TITLE>
<waml_content> ... news story ... </waml_content>
<waml_content> <B> news</B> story continued ... </waml_content>
</waml_page>
</body>
</HTML>
```

Multiple waml pages on the same HTML page can be defined as above where each waml page is encapsulated within a set of waml_page tags. However, in certain cases where the content of the waml pages is interleaved the following describes the schema:

```
<waml_page version=1.0 id=1>
<TITLE><waml_title> Yahoo news story title </waml_title></TITLE>
<waml_content> yahoo news story etc </waml_content>
<waml_content> <B>yahoo news</B> story continued
</waml_content>
</waml_page>
<waml_page version=1.0 id=2>
<waml_content> yahoo news story etc </waml_content>
</waml_page>
<waml_action name="action1" value="Action 1" link="http:// ..." id=1 />
<waml_action name="action2" value="Action 2" link="http:// ..." id=2 />
<waml_action name="action3" value="Action 3" link="http:// ..." id=2 />
```

The 'id' attribute defined in the "waml_action" tag is used to associate the action with the appropriate waml page.

The above tags represent one set of syntax to achieve the purpose of WAML. Also note that although we mention these tags in HTML context, these are applicable to any other content format.

WAML Specification

It is easy to see how the above described tags within an HTML page are easily translatable to WAML on mobile phones. As stated earlier, at a high level WAML consists of content followed by actions that can be performed on that content.

Backus Naur Form:

[waml]=[waml_content] [waml_actions]

[waml_content]=[text] or [wml] or [xhtml]

[waml_actions]=[waml_action]

[waml_action]=[waml_action attributes] [waml_content]

[waml_action attributes]=[name] and/or [value] and/or [order] and/or [url]

Sample WAML Page

WAML is XML1.0 compliant. We show below what a sample WAML page will look like. This WAML page is generated from the html pages embedded with WAML tags or a content provider can directly provide WAML pages also.

```
<?xml version="1.0"?>
<waml_page>
<waml_title> WWII Vets Gather for Memorial Dedication </waml_title>
<waml_author> Calvin Woodward, Associated Press </waml_author>
<waml_date> May 29, 2004 </waml_date>
<waml_summary> </waml_summary>
<waml_content parsetype= "xhtml">WASHINGTON-America dedicated
a memorial Saturday to the fast-thinning ranks of World War II veterans,
a poignant last hurrah drawing together tens of thousands of old soldiers,
sailors, and heroes of the home front.
<input type="text" name=variable1 value=ww2vets/>
... content1 ...
</waml_content>
<waml_action name="readcomments" value="Read Comments"
order="1" url="http://..." method="post">
</waml_action>
<waml_action name="postcomments" value="Post Comments" order="2"
url="http://..." method="post">
<waml_content parsetype="xhtml">Post Comments on "WWII Vets
Gather for Memorial Dedication"
Subject <input type="text" name=subject/>
Detailed Comments <input type="textarea" name=comments/>
</waml_content>
</waml_action>
</waml_page>
```

Note that all text inside waml_content can be xhtml, html, wml, etc. or even plain text. The format will be defined by the parsetype attribute of waml_content.

Figure 4A:
FIG. 4a is a diagram schematically illustrating a screen on a mobile device in accordance with one embodiment.

The above page is illustrated in the second screen of FIG. 4a. Users can perform certain actions based on the content, e.g., in this case can read/post comments corresponding to the news articles received.

Figure 4B:
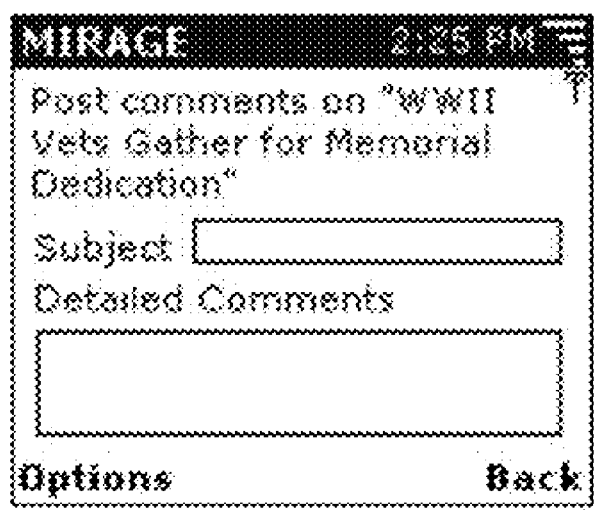
FIG. 4b is a diagram schematically illustrating a screen on a mobile device in accordance with one embodiment.

On hitting "Post Comments" the next screen, FIG. 4b shows up. Users can post his/her comments on a news article. This screen is also presented in the WAML content of the previous page. Such architecture improves the usability of the interface as users don't need to request data from Content Server 102 as often.

Also note that certain actions e.g., Exit Mirage, Delete, Forward, Next Message are inserted automatically by Mobile Content Viewer 214. Mobile Content Viewer 214 combines the content from the WAML as well its local policies to present subscription based content to the user.

WAML actions allow users to move from one page to another. We define below the attributes of actions:

Name: Action name if specified must be unique among all actions in that page. This allows Viewer to cache actions.

Value: This shows up on the mobile phone users screen as the name of the action.

Order: This allows the Viewer to order the actions when displayed on the phone screen.

URL: When this action is selected, this is where Mobile Content Viewer 214 requests for the next WAML page.

The functioning of the actions defined in the above page is described below:

Readcomments: This action would show up first among all actions. When selected the Viewer will contact the URL specified to get the new WAML page.

Postcomments: This action would show up second among all the actions. When selected content will show up on the screen as described in FIG. 4b. This has fields that require user input. Upon entering the information the Viewer will contact the specified URL with the appropriate user inputted data.

HTML Input Types

WAML does not have any notion of a form like in html, however, it does recognize the input types defined in html (e.g., tags such as "input" etc.). The input_types may lie either in the waml_content section of the waml page or inside the waml_content section of an action.

The input parameters are only passed when a user selects an action which has a method specified, i.e., get or post. Otherwise, it is treated as a simple URL.

When a user selects an action which has an associated method specified, 2 kinds of input variables are passed to the server Those specified in the waml_content section of the waml page Those specified in the waml_content section of the particular action that is selected.

For example, if a user selects action "postcomments," variables, subject and comments will all be passed.

Note that in the current illustration of the WAML specification, the tags described are the same as the WAML tags described in the previous section. This is one illustrative example of the invention. The invention will also cover the case where the set of tags used for selective content aggregation are different from those in the formatted content (i.e., the WAML specification in the above illustration) and there is a well-defined translation between the set of tags.

The invention also covers the case when a different set of markup tags are used to define the 'key context' of the source and the associated 'key links/actions' and how to render the key context and the key links/actions on to the mobile device. Context can be defined both within the content source or externally. The relevant context can be defined simply using some metadata tags in XML, in binary format within a text or multimedia (image/video) or even using Semantic Web Languages like RDF, OWL, etc. The markup can also contain different parameters to consider which things to be shown to which device or category of devices. For example, the markup might say an image is to be shown on only a particular category of devices.

User Personalization

Personalization is done via specifying WAML Content Personalization Options in the Personalization engine 116. The personalization options enable users to request content specific to user interests. E.g., Is a user is interested in news only about specific author, then user can specify certain keywords specifying the name of the author. If a user is interested in books by a particular author, then he should be able to specify that. Alternatively, if a user is interested in cheap airline tickets between two cities but only within a certain price range, he should be able to specify that. Depending on the values assigned by the user to each of the personalization options, only specific information is sent to the user. So in the above case only the price of those tickets that fall in the price range specified by the user, will be sent to the user.

Content Server 102 aggregates content (html, xhtml, rss , xml etc.) from multiple data sources 105. The content providers can specify personalization options within their content. Below we describe a case in which within a RSS feed, a content provider can specify the information about books, their prices, authors and specified personalization options.

```
<rss version="0.91">
<channel>
<waml_options>
<waml_option tag="author", type="string" name="Author"/>
```

```
<waml_option tag="price", type="dollar" name="Price $"/>
</waml_options>
<title>Books feeds</title>
<item>
<title>Book 1..</title>
<description> book 1 description </description>
<waml_option_value tag="author" value=" author name of book 1">
<waml_option_value tag="price" value="20">
</item>
<item>
<title>Book 2</title>
<description> Book 2 description </description>
<waml_option_value tag="author" value="author name of book 2">
<waml_option_value tag="price" value="30">
</item>
</channel>
</rss>
```

Note the waml_options, waml_option, and waml_option_value tags in the above example are explained in the context of RSS but are applicable to other subscription content as well.

1. WAML_OPTIONS waml_options acts as an enclosure for waml_option tag in which the actual personalization options are specified.

2. WAML_OPTION waml_option defines the kind of content personalization options which a content provider wants to provide for the content.

<waml_option tag="author", type="string" name="Author"/>

The attribute "tag" defines an id for the specified personalization option. The attribute "type" specifies the kind of personalization option. The "type" attribute enables the Content Server to do specific operations on the content. e.g., The type "string" for the attribute "type", enables it to know that the values for "author" are of type string and it should render it as a text field on the visual interface as well as filtering has to be done taking it into account it's a string.

<waml_option tag="price", type="dollar" name="Price $"/>

In the above case, the type is of type "dollar", which enables the system to know it's a type of a price range with some currency value and needs to do filtering accordingly.

Similarly other types can be specified which enables it to take not just one value but multiple values or enables it to define a price range, etc.

The "name" attribute in waml_option renders this text on the screen when specifying the personalization options.

3. WAML_OPTION_VALUE waml_option_value refers to the actual data on which content personalization options defined by waml option can be applied.

<waml_option_value tag="author" value="author name of book 2">

<waml_option_value tag="price" value="30">

The tag attribute in waml_option_value refers to the same as defined in waml_option. The value attribute refers to the value of the data.

Note that the waml_options can be specified within html, xml and don't need to be always inside the rss file. In the above case the appropriate reference of the waml_option_value corresponding to the waml_option will need to be resolved by specifying the link from which waml_options can be obtained.

Specification of personalization options can be done in multiple ways. Certain tags within RSS can also be used to filter content.

```
<rss version="2.0" xmlns:dc="http://purl.org/dc/elements/1.1/"
  xmlns:waml="http://www.mywamlurl.com/1.0/">
<channel>
<title>Books feeds</title>
<item>
<title>Book 1..</title>
<description> book 1 description </description>
<dc:author> name of book 1</author>
<waml:price> 20 </price>
</item>
<item>
<title>Book 2</title>
<description> Book 2 description </description>
<dc:author> name of book 2</author>
<waml:price> 40 </price>
</item>
</channel>
</rss>
```

In the above examples, xml name spaces provide a mechanism for knowing the types of tags and the values within the tags can be used for filtering content.

Content Server can aggregate this data from multiple content providers and then generate a user interface in WAML depending on the personalization options specified above. A user via the web interface or via Mobile Content Viewer will be able to browse through the interface and specify values accordingly. Taking into account the waml_option types or xml namespaces and the values specified by the user; the content server can provide filtering mechanisms and do filter content and provide only specific content to the user. We explain one illustrative filtering mechanism that leverages databases and the queries provided by databases.

Consider the above example where waml_options are:

<waml_options>

<waml_option tag="author", type="string" name="Author"/>

<waml_option tag="price", type="dollar" name="Price $"/>

</waml_options>

We have an equivalent table (say BooksTable) in the database that would at least have the following fields:

| String (represents Author) | Integer (represents Price) | Message |
|---|---|---|

Upon obtaining a message, the waml_option_value of author and price are obtained and stored in the corresponding fields in the table. The "message" field will also accordingly be updated with either the contents of the message or the pointer to the location from where the contents of the message can be obtained.

Subsequently, if a user personalized the above content to obtain books by "Dale Carnegie" only when they are less than $25, a corresponding SQL query to obtain the relevant messages would be:

SELECT*FROM BooksTable WHERE price<25 AND author='Dale Carnegie'

The messages obtained by the above query for a particular can then be stored in the user database and subsequently delivered to the user.

In case content providers not specifying any content personalization options, the personalization options can also be defined on the Content Server to provide certain personalization parameters and the content will be transformed and interpreted accordingly.

Content Synchronization Between Viewer and Server

A user can perform multiple operations on mobile content viewer 214 or from web interface 212. We divide them into three categories:

Directory
Subscriptions
Messages

A directory contains subscriptions which the user has subscribed for and subscriptions contain messages containing the content that the user receives. The messages will normally contain content specified in WAML.

Directory Transactions
1. Add directory
2. Delete directory
3. Rename directory
Subscription Transactions
4. Add New Subscription
5. Delete subscription
6. Rename subscription
7. Move subscription from one directory to another
8. Modify personalization options of a feed
Message Transactions
9. Delete a message
10. Mark as important A user can perform the same set of transactions on Content Server 102 as well. The current invention proposes a unique methodology for synchronization and resolving conflicts.

Transaction Communication

A transaction stream from Mobile Content Viewer 214 to Content Server 102 or from Content Server 102 to Mobile Content Viewer 214 would look like:

[transactionA id="4"]
[transactionB id="5"]
[transactionC id="6"]

where transactionA, transactionB and transactionC refers to transactions related to directory, subscriptions or messages. These can contain some attributes and additional values. Each of the transaction has a transaction id associated to it, referred by the "id" attribute.

It is a sequence of transactions with unique identifiers. On receiving the transactions the other party (if a server sends transactions, then client responds with acknowledgements or vice versa) is expected to send acknowledgements in order for the transactions received. So a response to the above stream would be:

[ack id="4"]
[ack id="5"]
[ack id="6"]

Here "ack" refers to acknowledgement for the transaction with the "id" attribute referring to the transaction id for which the acknowledgement is being sent.

The following rules are followed with transactions syncing:

1. Transaction identifiers sent from Server 102 to Viewer 214 and from Viewer 214 to Server 102 operate independently.
2. All transactions are sent with identifiers that are consecutively increasing. The other party keeps track of what transaction number to expect next. This order also represents the order in which the transactions occurred.
3. The transactions and their identifiers are maintained across sessions.
4. All the acknowledgements are sent back in order of the transactions received.
5. Each side continues to store the transaction along with its unique identifier until it receives an acknowledgement for the same is received, after which it can delete that transaction.
6. The Viewer transactions take priority over Server transactions in case of conflict. For example, Server 102 deleted a directory which the user just renamed. The user rename would take priority and the server delete transaction will be undone.
7. Given rule 5, viewer 214 always sends its transactions to the server first. The server in turn sends back acknowledgements after executing Viewer transactions and undoing Server transactions which conflict. This is followed by the transactions occurred on the Server 102.
8. While communication, as stated in rule 6, is in progress and a transaction occurs on Viewer 214, Viewer 214 no longer accepts Server transactions and in turn send its newly executed transaction first.
9. In case of data transfer failure, Viewer 214 or Server 102 would start sending transactions beginning on the immediate next transaction whose acknowledgement was received. For example, Viewer 214 has received an acknowledgement for transaction 7 when the connection between Server 102 and Viewer 214 broke. In the next session, Viewer 214 would start sending transactions from transaction 8 (including transaction 8).
10. If a transaction is received whose identifier was already seen (duplication), it is possible that its acknowledgement was not received by the other party. In such a circumstance, the transaction would just be discarded because it was already executed earlier, however, its acknowledgement would be re-sent to the other party.
11. The transaction identifiers wrap around after reaching a certain specified maximum threshold value.

The above communication provides many advantages:

1. Simple protocol that ensures that all transactions are always executed successfully and requires minimal over head on Viewer 214 which is constrained on computation power.
2. Since transaction identifiers are retained across sessions, the above protocol is session independent.
3. The above protocol is optimized to achieve maximum throughput on high latency low bandwidth wireless links.
4. This transaction mechanism can be applied not just to directory, subscription and message transactions but to any other transaction which can be added in future between the client and the server e.g., adding icons for directories or transactions for syncing content personalization options.

Content Archival on Server

Other operations are performed at Mobile Content Viewer 214 without user intervention 1. Automatic message deletion
2. Automatic deletion of parts of message However, these messages are still archived on Content Server 102. The above operations may require Viewer 214 to fetch random messages or parts of the message from the Content Server 102 upon user request.

Smart Viewing of Links

Viewer 214 provides a smart way for browsing through links embedded in content. Wireless devices lack a pointer device and as a result it is hard for a user to browse through links with a page (WML, XHTML, HTML, cHTML, etc.), if there are a number of links within a page.

Consider a sample WML document as described below.

```
<?xml version="1.0" encoding="UTF-8"?>
<!DOCTYPE wml PUBLIC "-//WAPFORUM//DTD WML 1.1//EN"
"http://www.wapforum.org/DTD/wml_1.1.xml">
<wml>
<card id="main" title="Sample Page">
<p>A simple paragraph. <br/>
<a href="test.wml">Test content</a>.
This is line <br/><a href="one.wml">one</a> of the paragraph.
This is line <br/><a href="two.wml">two </a> of the paragaraph.
This is line <br/><a href="three.wml">three</a> of the paragraph.
This is line <br/><a href="four.wml">four</a> of the paragraph.
This is line <br/><a href="five.wml">five</a> of the paragraph. <br/>
<a href="link.wml">End Line</a>
</p>
</card>
</wml>
```

This document when as viewed on an emulator shows the content as described in FIG. 5.

On an actual wireless device with small screens, a user will not be able to see the whole content and will need to scroll down the text. Even for clicking a particular link, a user needs to scroll up and down, choose a specific link and then will click the link. Wireless devices normally don't contain any pointer devices like a mouse for a PC, which eases the process of choosing a particular link.

Clicking of links can be simplified on wireless devices, by showing the links as shown in FIGS. 6a and 6b. The content is shown of how it can be viewed on a mobile phone. Arrows are meant to show a user can scroll the content up and down.

The links present in the content, can be showed when a user clicks "Options" or any other menu provided on clicking a button on the mobile phone. Note that only those links are shown in the Options menu, which are currently visible on the mobile screen. In FIG. 6a, only the following links are visible ("Test Content", "one", "two", "three" and "four") on the wireless screen. These links are shown when a user clicks for options.

When a user browses down the content, then content will be as shown in FIG. 6b. Note that the link to "Test Content" is not there now on the mobile screen as well as in the options menu. Similarly link to ("five", "End Line") exists in the mobile phone screen because the user scrolled down the content. As a result the options menu also contains these links.

The options menu can refer to the text in the links e.g., ("one", "two") as shown in the figure above or it can also contains other information which is present in the content. e.g., "line one", "line two" instead of the words "one" and "two" as the words "one" and "two" are preceded by the word "line" in the content. There can be other ways for showing the name of the link in the options menu. E.g., the "a href" tag in the wml document can specifically contain a reference to the name as shown below. In this case, the name "First Line" is shown in the options menu.

This is line <a href="one.wml" name="First Line">one</a>of the paragraph.

Figures 7A, 7B:
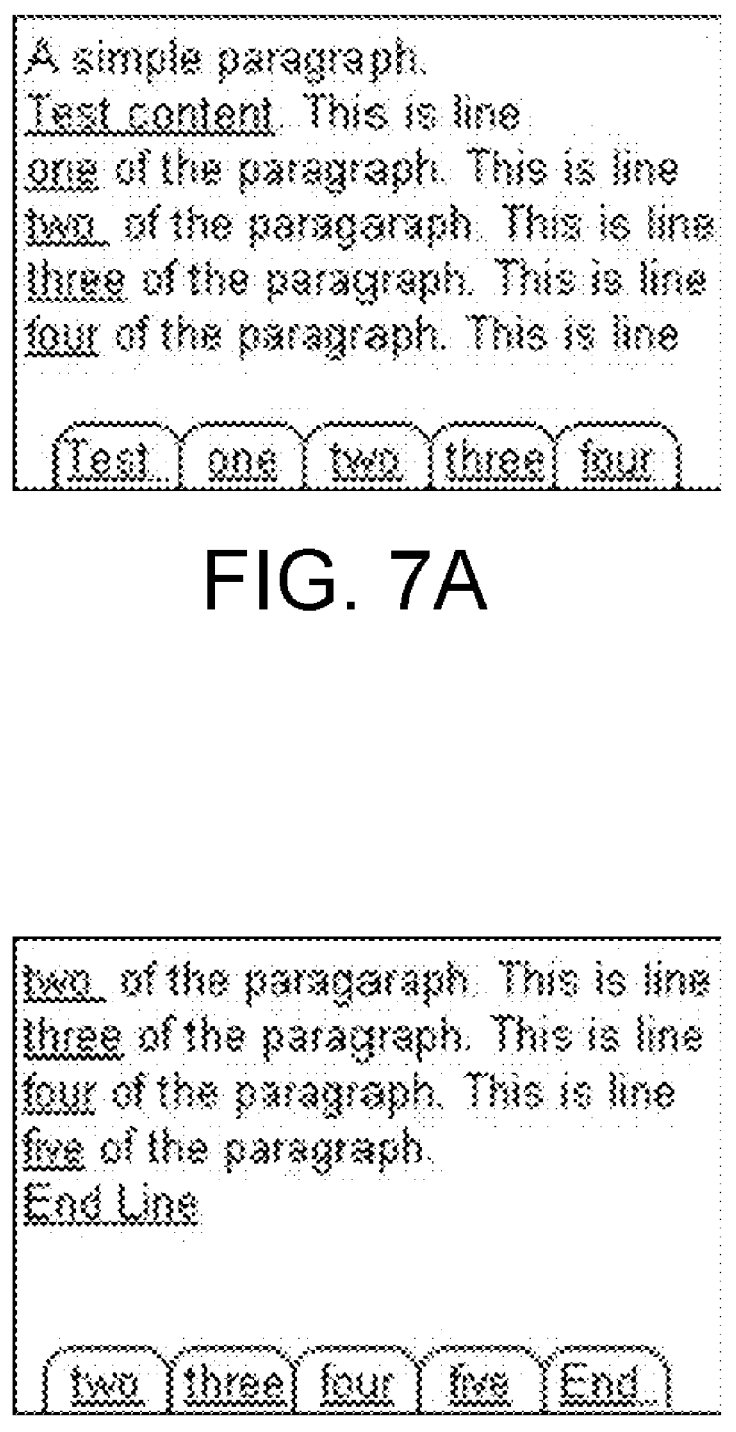

The above schema also applies to the case where the links show up as tabs instead of showing in the options menu as shown in FIGS. 7A, 7B.

The same schema would also apply where instead of the options menu or the tabs, alphanumeric characters are associated with the links currently on display on the screen. Pressing the alphanumeric characters accordingly would allow one to easily follow a link. An example is illustrated in FIGS. 8A, 8B.

Notice the superscripts 1, 2, 3, 4, and 5 associated with the links that are currently on display on the screen of the mobile device. By pressing key 1, 2, 3, 4, or 5 on the keypad of the mobile device one could select the appropriate link without ever needing a pointing device.

The above method of showing embedded links can be applied to wml, xhtml, html, or any other form of wireless content.

Those of ordinary skill in the art will appreciate that the method of showing embedded links shown are not intended to be limiting and that other form of wireless content (wml, xhtml, html) can be used without departing from the inventive concepts herein disclosed.

As can be appreciated, there are many aspects and embodiments of the invention. Presented below in exemplary claim format are various embodiments and aspects of the invention. The invention may include any one or combination of the aspects recited.

1. A method of communicating with a mobile device comprising:
   aggregating content from at least one source of content having a first set of markup tags readable by executable code on the mobile device and a second set of markup tags;
   formatting the aggregated content having the second set of markup tags with the first set of markup tags; and
   displaying the formatted content and a set of actions that are based on the first set of markup tags.

2. The method of claim 1 wherein the set of actions further comprises links and functions.

3. The method of claim 1 wherein the set of actions comprises a link to a URL address.

4. The method of claim 1 further comprising:
   receiving a user preference; and
   filtering out at least one of aggregated content or formatted content not meeting the user preference.

5. The method of claim 4 further comprising:
   transmitting filtered content meeting the user preference to the mobile device.

6. The method of claim 4 further comprising:
   transmitting filtered content meeting the user preference to at least one of a web portal or a desktop client.

7. The method of claim 4 further comprising:
   storing the formatted content; and
   storing the filtered content.

8. The method of claim 7 further comprising:
   synchronization of the stored filtered content with a mobile content viewer in the mobile device.

9. The method of claim 4 further comprising:
   receiving the user preference from at least one of a web portal, a desktop client, or the mobile device.

10. The method of claim 1 wherein the formatting further comprises:
    applying a WAML converter to the aggregated content having the second set of markup tags, wherein the first of set markup tags includes WAML tags.

11. The method of claim 1 wherein the second set of markup tags further comprises at least one of XML source, a RSS source, an ATOM source, a HTML source, a cHTML source, a XHTML source, a DHTML source, or a WML source.

12. A system for communicating with a mobile device comprising:
    a content server for aggregating content from at least one source of content having a first set of markup tags readable on the mobile device and a second set of markup tags, and formatting the aggregated content having the second set of markup tags with the first set of markup tags; and a content viewer for displaying formatted content and a set of actions that are based on the first set of markup tags.

13. The system of claim 12 wherein the content viewer further comprises:

a program for displaying the formatted aggregated content based on a user preference associated with the mobile device.

14. The system of claim 12 wherein the content viewer resides on a mobile device that includes an environment compatible with the program, the environment further comprising at least one of Java, Symbian, Windows Mobile, Brew, Palm, Blackberry, or Linux.

15. The system of claim 12 wherein the content server further comprises:

a content aggregator;

a WAML converter coupled to the content aggregator;

a first database coupled to the content aggregator and the WAML converter;

a content filter coupled to the first database, the content filter associated with the user preference; and a second database coupled to the content filter.

16. The system of claim 12 wherein the actions further comprises links and functions.

17. The system of claim 12 wherein the action comprises a link to a URL address.

18. The system of claim 15 wherein the content viewer further comprises:

a program for displaying the formatted aggregated content based on a user preference associated with the mobile device.

19. The system of claim 15 wherein the content viewer resides on a mobile device that includes an environment compatible with the program, the environment further comprising at least one of Java, Symbian, Windows Mobile, Brew, Palm, Blackberry, or Linux.

20. The system of claim 12 wherein the content server further comprises:

a content aggregator, coupled to a content input;

a first WAML converter coupled to the content aggregator;

a second WAML converter, coupled to the content input;

a first database coupled to the content aggregator and the WAML converter;

a content filter coupled to the first database, the content filter associated with the user preference; and a second database coupled to the content filter.

21. The system of claim 20 wherein the content viewer further comprises:

a mobile content viewer coupled to the second WAML converter and the second database; and a web interface coupled to the second database, wherein the mobile content viewer has a program for displaying the filtered content stored in the second database.

22. The system of claim 20 wherein the content viewer further comprises:

a mobile content viewer coupled to the second WAML converter and the second database; and a web interface coupled to the second database, wherein the mobile content viewer has a program for displaying the filtered content stored in the second database, and the mobile content viewer resides on a mobile device that includes an environment compatible with the program, the environment further comprising at least one of Java, Symbian, Windows Mobile, Brew, Palm, Blackberry, or Linux.

23. The system of claim 12 wherein the content viewer further comprises:

a synchronization module coupled to the content server;

a database coupled to the synchronization module; and a user interface communicating with the content server, the synchronization module, and the database.

24. The system of claim 12 wherein the first of set markup tags includes WAML tags and the second set of markup tags further comprises at least one of XML source, a RSS source, an ATOM source, a HTML source, a cHTML source, a XHTML source, a DHTML source, or a WML source.

25. A server for communicating with a mobile device comprising:

a content server for aggregating content from at least one source of content having a first set of markup tags readable by the mobile device and a second set of markup tags, different from the first set of markup tags, and formatting the aggregated content having the second set of markup tags with the first set of markup tags; and a converter for formatting the aggregated content having the second set of markup tags with the first set of markup tags; and a first database for storing the converted content and the aggregated content having a first set of markup tags;

a filter for filtering the stored content based on a user preference associated with the mobile device; and a second database for storing the filtered content.

26. The server of claim 25 wherein the second database further comprises a set of actions associated with the filtered content using the first set of markup tags, the actions including links and functions.

27. The server of claim 25 wherein the links further comprise URL addresses.

28. The server of claim 25 wherein the converter further comprises a WAML converter to convert the aggregated content having the second set of markup tags with the first set of markup tags, wherein the first of set markup tags includes WAML tags and the second set of markup tags further comprises at least one of XML source, a RSS source, an ATOM source, a HTML source, a cHTML source, a XHTML source, a DHTML source, a WML source.

29. The server of claim 25 further comprising:

a synchronization module for synchronizing the stored filtered content with a mobile content viewer in the mobile device.

30. The server of claim 25 further comprising:

a synchronization module for synchronizing the stored filtered content with a desktop client.

31. The server of claim 25 wherein the user preference is communicated to the server via the mobile device.

32. The server of claim 25 wherein the user preference is communicated to the server with at least one of a web portal page or a desktop client.

33. A method of communicating with a mobile device comprising:

retrieving content from at least one source of content having a first set of markup tags and a second set of markup tags;

formatting the retrieved content using the first set of markup tags and a third set of markup tags readable by executable code on the mobile device; and displaying the formatted content and a set of actions that are based on the third set of markup tags.

34. A system for communicating with a mobile device comprising:
- a content server for retrieving content from at least one source of content having a first set of markup tags and a second set of markup tags, and formatting the retrieved content using the first set of markup tags and a third set of markup tags readable by executable code on the mobile device; and
- a content viewer for displaying the formatted content and a set of actions that are based on the third set of markup tags.

35. A server for communicating with a mobile device comprising:
- a content server for retrieving content from at least one source of content having a first set of markup tags on the mobile device and a second set of markup tags;
- a converter for formatting the retrieved content using the first set of markup tags and the third set of markup tags readable by executable code on the mobile device; and
- a first database for storing the converted content and the retrieved content having the third set of markup tags;
- a filter for filtering the stored content based on a user preference associated with the mobile device; and
- a second database for storing the filtered content.

36. A method of communicating with a server comprising:
- receiving a content having a first set of markup tags readable by executable code on a mobile device; and
- displaying a set of actions based on the content using the first set of markup tags,
- wherein the content includes an original content having a first set of markup tags or a formatted content having a second set of markup tags formatted with the first set of markup tags.

37. The method of claim 36 further comprising:
- requesting the content based on a user preference.

38. The method of claim 36 wherein the displaying further comprises:
- displaying the content in a first screen; and
- displaying the set of actions in a second screen based on the content displayed in the first screen.

39. The method of claim 38 wherein the set of actions further comprises links and functions.

40. The method of claim 38 wherein the set of actions comprise a link to a URL address.

41. The method of claim 36 wherein the first of set markup tags includes WAML tags and the second set of markup tags further comprises at least one of XML source, a RSS source, an ATOM source, a HTML source, a cHTML source, a XHTML source, a DHTML source, a WML source.

42. The method of claim 36 further comprising:
- a synchronization module for synchronizing the content received with the server.

43. A mobile device for communicating with a server comprising:
- a receiver for retrieving a requested content having a first set of markup tags readable by executable code on a mobile device; and
- a content viewer coupled to the receiver, the content viewer displaying a set of actions based on the content using the first set of markup tags,
- wherein the requested content includes an original content having a first set of markup tags or a formatted content having a second set of markup tags formatted with the first set of markup tags.

44. The mobile device of claim 43 wherein the content viewer further comprises:
- a browser capable of reading the content having a first set of markup tags.

45. The mobile device of claim 43 wherein the set of actions further comprises links and functions.

46. The mobile device of claim 43 wherein the set of actions comprise a link to a URL address.

47. The mobile device of claim 43 wherein the first of set markup tags includes WAML tags and the second set of markup tags further comprises at least one of a XML source, a RSS source, an ATOM source, an HTML source, a cHTML source, a XHTML source, a DHTML source, or a WML source.

48. A computer-readable medium storing a plurality of data structures, each data structure comprising:
- a content markup tag section comprising a description of a format of a content to be displayed; and
- an action markup tag section comprising a description of a function to operate on the content.

49. The computer-readable medium of claim 48 wherein the content markup tag section further comprises at least one of a text, XML, an HTML, a cHTML, a XHTML, a DHTML, or a WML format.

50. The computer-readable medium of claim 48 wherein the action markup tag section further comprises an action attribute markup tag section.

51. The computer-readable medium of claim 48 wherein the action attribute tag section further comprises at least one of a name, a value, an order, a link, or a URL.

52. A computer-readable medium storing a plurality of data structures, each data structure comprising:
- an option tag section comprising at least one parameter name and an type attribute associated with the at least one parameter name, wherein the option tag section defines a parameter which may be used to personalize content delivered to a user; and
- an option value tag section, associated with the option tag section, comprising the at least one parameter name defined in the option tag section and a value parameter, wherein the value parameter has the type attribute described in the option tag section.

53. A graphical user interface having windowing capability comprising:
- first windowing means for displaying a requested content having a first set of markup tags readable by executable code on a mobile device, the requested content including an original content having the first set of markup tags or a formatted content having a second set of markup tags formatted with the first set of markup tags; and
- second windowing means for displaying a set of actions based on the requested content.

54. The graphical user interface of claim 53 wherein the second windowing means overlays the first windowing means.

55. The graphical user interface of claim 53 wherein the first windowing means is provided using a full screen.

56. A graphical user interface having windowing capability comprising:
- first windowing means for displaying scrollable content; and
- second windowing means for displaying a list of actions associated with the scrollable content, wherein the list of actions scrolls in connection with scrollable content visible in the first windowing means.

57. The graphical user interface of claim 56 wherein when a link in the scrollable content becomes viewable in the first windowing means, a corresponding action to the link becomes viewable in the second windowing means.

58. The graphical user interface of claim 56 wherein when a link in the scrollable content disappears from view in the first windowing means, a corresponding action to the link disappears from view in the second windowing means.

59. The graphical user interface of claim 56 wherein the second windowing means overlays the first windowing means.

60. The graphical user interface of claim 56 wherein the first windowing means is provided using a full screen.

61. A method of communicating with a mobile device comprising:
   receiving items from an RSS feed;
   obtaining personalization parameters and data types for items corresponding to the RSS feed;
   generating a table based on the data types of the personalization parameters, each entry in the table comprising at least two attributes;
   storing personalization parameter values associated with the item in the table; and
   issuing a SQL query corresponding to a user preference on the table.

62. A method of communicating with a mobile device comprising:
   receiving items from an RSS feed;
   storing personalization parameter values associated with the items in a table; and
   issuing a SQL query corresponding to a user preference on the table.

63. The method of claim 61 wherein the at least two attributes further comprise:
   a first attribute; and
   a second attribute comprising a reference to an item.

64. The method of claim 61 further comprising database tables with columns corresponding to data types provided in the personalization options specification which may lie in the RSS header, among other locations.

65. The method of claim 61 further comprising storing items along with its personalization option values in the database tables.

66. The method of claim 61 further comprising applying SQL search queries to filter items as per the user specified personalization criteria.

67. The method of claim 61 wherein the RSS feed is replaced by an ATOM feed.

68. The method of claim 62 wherein the RSS feed is replaced by an ATOM feed.

69. The method of claim 1 further comprising:
   executing a program on the mobile device to display the formatted content.

70. The method of claim 1 wherein the mobile device includes an environment compatible with the program, the environment further comprising at least one of Java, Symbian, Windows Mobile, Brew, Palm, Blackberry, or Linux.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method of communicating with a mobile device comprising:
   aggregating content from at least one source of content having a first set of markup tags readable by executable code on the mobile device and a second set of markup tags;
   formatting the aggregated content having the second set of markup tags with the first set of markup tags; and
   displaying formatted content in a window of the mobile device and a set of actions in a context menu that are based on the first set of markup tags.

2. The method of claim 1 further comprising:
   executing a program on the mobile device to display the formatted content.

3. The method of claim 2 wherein the mobile device includes an environment compatible with the program, the environment further comprising at least one of Java, Symbian, Windows Mobile, Brew, Palm, Blackberry, or Linux.

4. The method of claim 1 further comprising:
   receiving a user preference; and
   filtering out at least one of aggregated content or formatted content not meeting the user preference.

5. The method of claim 4 further comprising:
   transmitting filtered content meeting the user preference to the mobile device.

6. The method of claim 4 further comprising:
   transmitting filtered content meeting the user preference to at least one of a web portal or a desktop client.

7. The method of claim 4 further comprising:
   storing the formatted content; and
   storing the filtered content.

8. The method of claim 7 further comprising:
   synchronizing the stored filtered content with a mobile content viewer in the mobile device.

9. The method of claim 4 further comprising:
   receiving the user preference from at least one of a web portal, a desktop client, or the mobile device.

10. The method of claim 1 wherein the formatting further comprises:
   applying a WAML converter to the aggregated content having the second set of markup tags, wherein the first of set markup tags includes WAML tags.

11. The method of claim 1 wherein the second set of markup tags further comprises at least one of an XML source, a RSS source, an ATOM source, a HTML source, a cHTML source, a XHTML source, a DHTML source, or a WML source.

12. A system for communicating with a mobile device comprising:
   a content server for aggregating content from at least one source of content having a first set of markup tags readable on the mobile device and a second set of markup tags, and formatting the aggregated content having the second set of markup tags with the first set of markup tags; and
   a content viewer for displaying formatted content in a window of the mobile device and a set of actions in a context menu that are based on the first set of markup tags.

13. The system of claim 12 wherein the content viewer further comprises:
   a program for displaying the formatted aggregated content based on a user preference associated with the mobile device.

14. The system of claim 12 wherein the content viewer resides on a mobile device that includes an environment compatible with the program, the environment further comprising at least one of Java, Symbian, Windows Mobile, Brew, Palm, Blackberry, or Linux.

15. The system of claim 12 wherein the content server further comprises:
   a content aggregator;
   a WAML converter coupled to the content aggregator;

a first database coupled to the content aggregator and the WAML converter;

a content filter coupled to the first database, the content filter associated with user preference; and a second database coupled to the content filter.

16. The system of claim 15 wherein the content viewer further comprises:

a mobile content viewer coupled to the second database; and a web interface coupled to the second database, wherein the mobile content viewer has a program for displaying the filtered content stored in the second database.

17. The system of claim 15 wherein the content viewer further comprises:

a mobile content viewer coupled to the second database; and a web interface coupled to the second database, wherein the mobile content viewer has a program for displaying the filtered content stored in the second database, and the mobile content viewer resides on a mobile device that includes an environment compatible with the program, the environment further comprising at least one of Java, Symbian, Windows Mobile, Brew, Palm, Blackberry, or Linux.

18. The system of claim 12 wherein the content viewer further comprises:

a synchronization module coupled to the content server;

a database coupled to the synchronization module; and a user interface communicating with the content server, the synchronization module, and the database.

19. A server for communicating with a mobile device comprising:

a content server for aggregating content from at least one source of content having a first set of markup tags readable by the mobile device and a second set of markup tags, different from the first set of markup tags, and formatting the aggregated content having the second set of markup tags with the first set of markup tags;

a converter for formatting the aggregated content having the second set of markup tags with the first set of markup tags;

a first database for storing the converted content and the aggregated content having a first set of markup tags;

a filter for filtering the stored content based on a user preference associated with the mobile device; and a second database for storing the filtered content.

20. The server of claim 19 wherein the second database further comprises a set of actions associated with the filtered content using the first set of markup tags, the actions including links and functions.

* * * * *